(12) United States Patent
Srimal et al.

(10) Patent No.: US 11,003,373 B2
(45) Date of Patent: May 11, 2021

(54) SYSTEMS AND METHODS FOR MANAGING PHYSICAL-TO- LOGICAL ADDRESS INFORMATION

(71) Applicant: Western Digital Technologies, Inc., San Jose, CA (US)

(72) Inventors: Niraj Srimal, San Jose, CA (US); Ramanathan Muthiah, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 206 days.

(21) Appl. No.: 16/455,900

(22) Filed: Jun. 28, 2019

(65) Prior Publication Data

US 2020/0409554 A1 Dec. 31, 2020

(51) Int. Cl.
*G06F 3/06* (2006.01)
*G06F 12/10* (2016.01)
*G06F 12/0875* (2016.01)

(52) U.S. Cl.
CPC ............ *G06F 3/064* (2013.01); *G06F 3/0604* (2013.01); *G06F 3/0659* (2013.01); *G06F 3/0673* (2013.01); *G06F 12/0875* (2013.01); *G06F 12/10* (2013.01); *G06F 2212/1044* (2013.01); *G06F 2212/608* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 2016/0253112 A1* | 9/2016 | Chen | G06F 3/0647 714/6.21 |
| 2019/0107964 A1* | 4/2019 | Liang | G06F 3/0614 |
| 2020/0034052 A1* | 1/2020 | Mukku | G06F 3/065 |

* cited by examiner

*Primary Examiner* — Denise Tran
(74) *Attorney, Agent, or Firm* — Dickinson Wright PLLC; Steven Hurles

(57) ABSTRACT

A method for managing physical-to-logical address information in a memory system includes determining whether a memory fragment of a memory block is a last memory fragment of the memory block. The method also includes, in response to a determination that the memory fragment is not the last memory fragment of the memory block: performing a write operation on the memory fragment; storing, in cache associated with the memory system, physical-to-logical address information associated with the memory fragment; and, in response to a determination that the cache is full, writing, to a next memory fragment of the memory block, control metadata associated with physical-to-logical address information stored in the cache.

20 Claims, 9 Drawing Sheets

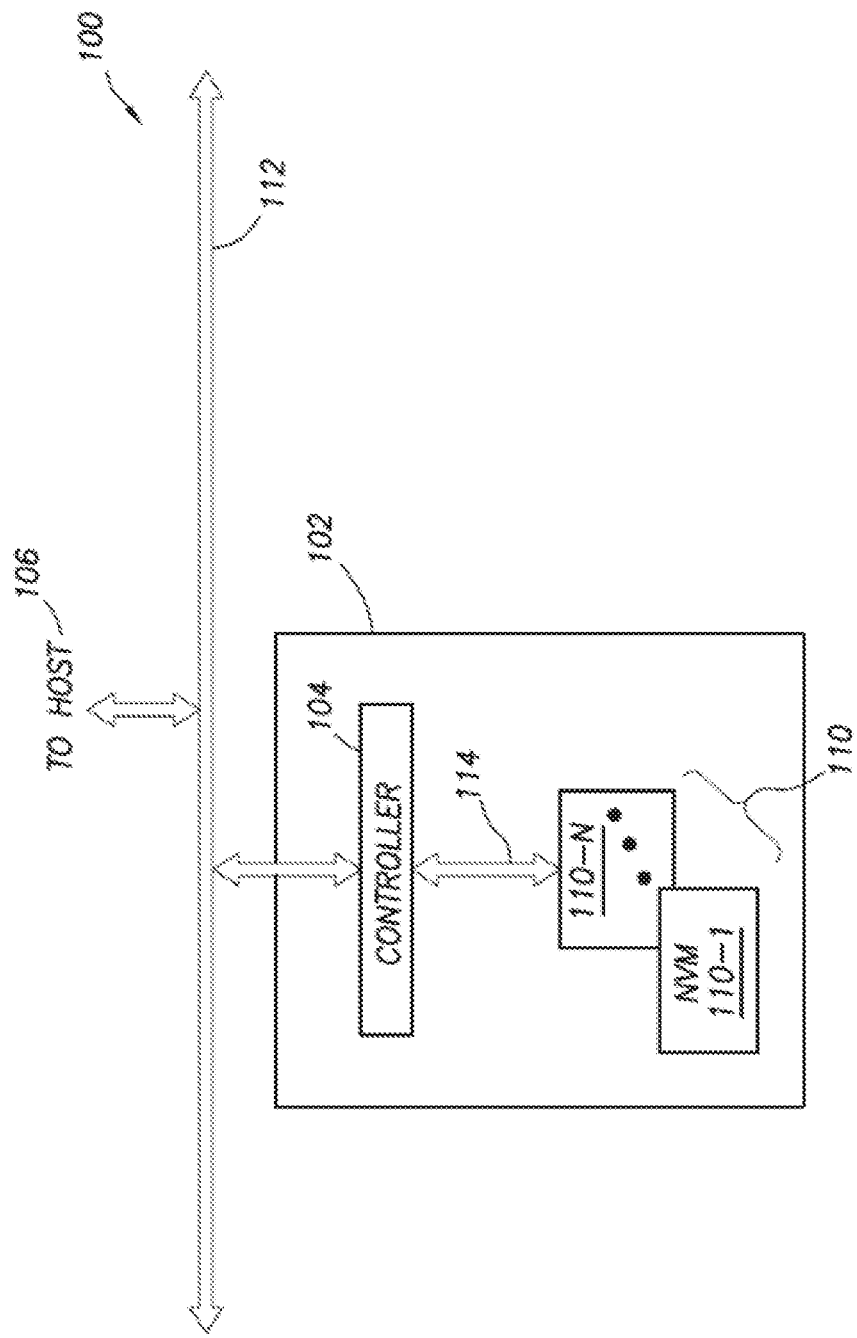

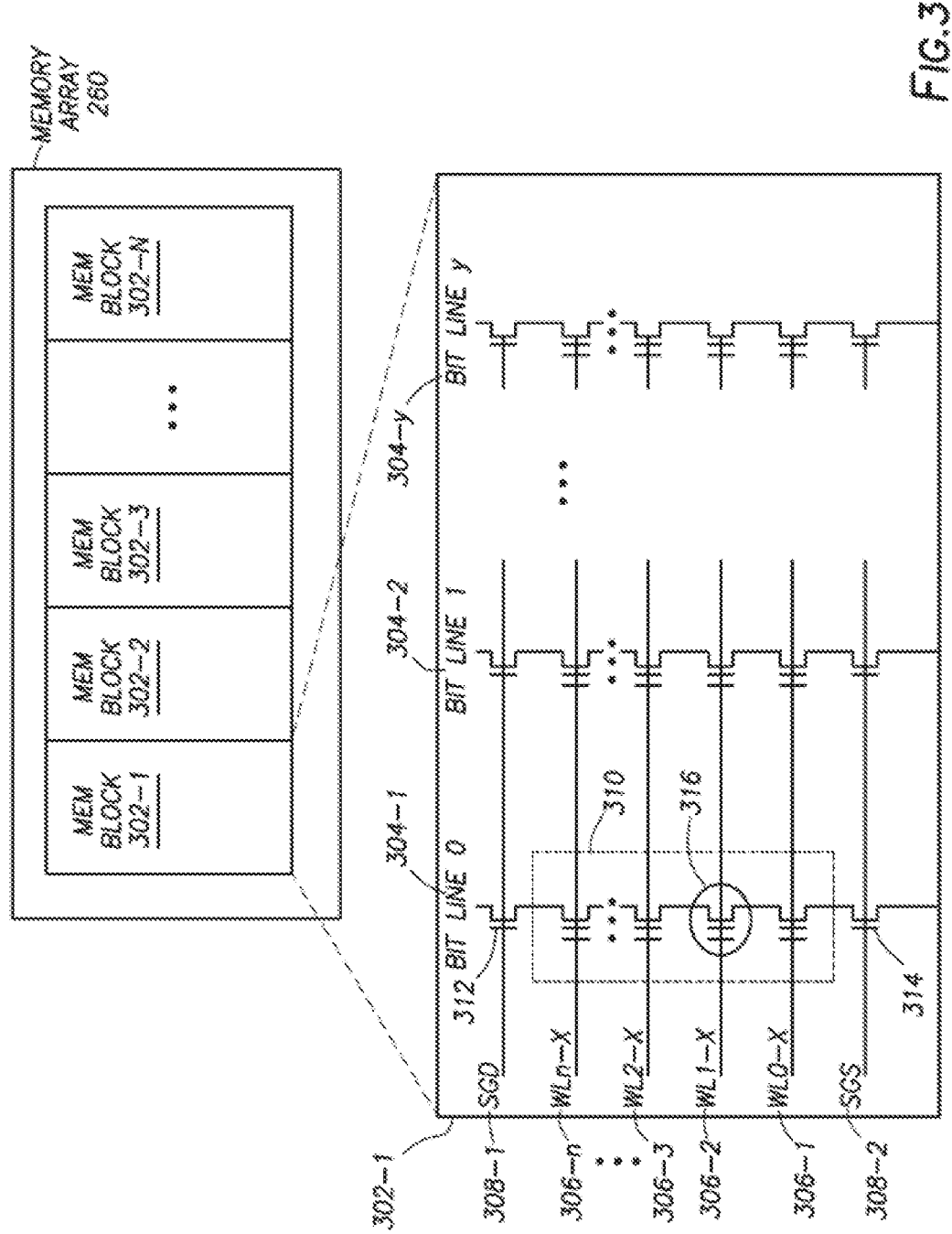

600

| Block | OFFSET FROM 0 |
|---|---|
| 9 | 1800 |
| 9 | 9240 |
| 9 | N (last memory fragment) |
| 15 | 682 |
| 15 | 1365 |
| 15 | 1748 |
| - | |
| - | |
| 27 | N (last memory fragment) |
| - | - |
| - | - |

SYSTEMS AND METHODS FOR MANAGING PHYSICAL-TO- LOGICAL ADDRESS INFORMATION

TECHNICAL FIELD

This disclosure relates to memory systems and in particular to systems and methods for managing physical-to-logical address information.

BACKGROUND

Non-volatile memory systems are a type of memory that retains stored information without requiring an external power source. Non-volatile memory is widely used in various electronic devices and in stand-alone memory devices. For example, non-volatile memory can be found in laptops, digital audio player, digital cameras, smart phones, video games, scientific instruments, industrial robots, medical electronics, solid-state drives, USB drives, memory cards, and the like. Non-volatile memory can be electronically programmed/reprogrammed and erased.

In such memory systems, memory management operations, such as garbage collection (e.g., compaction), are typically performed in order to reclaim memory that may include old or stale data. This may free up reclaimed memory for reprogramming and may generally improve memory performance. Memory systems use memory address information to identify and/or locate memory for garbage collection operations. Typically, such memory address information includes physical-to-logical address information, which indicates a mapping between physical addresses of the memory to logical address of the memory. Such memory address information is typically stored in a table in memory of the memory system, which may require an undesirable amount of memory.

SUMMARY

This disclosure relates generally to memory management systems and methods.

An aspect of the disclosed embodiments is a method for managing physical-to-logical address information in a memory system. The method includes determining whether a memory fragment of a memory block is a last memory fragment of the memory block. The method also includes, in response to a determination that the memory fragment is not the last memory fragment of the memory block: performing a write operation on the memory fragment; storing, in cache associated with the memory system, physical-to-logical address information associated with the memory fragment; and, in response to a determination that the cache is full, writing, to a next memory fragment of the memory block, control metadata associated with physical-to-logical address information stored in the cache.

Another aspect of the disclosed embodiments is a controller that includes a bus interface and a processor. The bus interface is in communication with one or more memory blocks of a memory system. The processor is configured to determine whether a memory fragment of a memory block is a last memory fragment of the memory block. The processor is further configured to, in response to a determination that the memory fragment is not the last memory fragment of the memory block: perform a write operation on the memory fragment; store, in cache associated with the memory system, physical-to-logical address information associated with the memory fragment; and in response to a determination that the cache is full, write, to a next memory fragment of the memory block, control metadata associated with physical-to-logical address information stored in the cache.

Another aspect of the disclosed embodiments is a memory management method. The method includes determining whether a memory fragment of a memory block is a last memory fragment of the memory block. The method also includes, in response to a determination that the memory fragment is not the last memory fragment of the memory block: performing a write operation on the memory fragment; storing, in cache associated with the memory system, physical-to-logical address information associated with the memory fragment; and in response to a determination that the cache is full, writing, to a next memory fragment of the memory block, control metadata associated with physical-to-logical address information stored in the cache. The method also includes storing, in a master table, information indicating the memory block and offset values indicating a location of the control metadata within the memory block. The method also includes performing a garbage collection operation on the memory block using the master table and the control metadata stored in the memory block.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 1A-1B generally illustrates a block diagram of an example non-volatile memory system according to the principles of the present disclosure.

FIG. 3 generally illustrates a memory block according to the principles of the present disclosure.

FIG. 6 generally illustrates an example data structure according to the principles of the present disclosure.

DETAILED DESCRIPTION

Figure 1B:
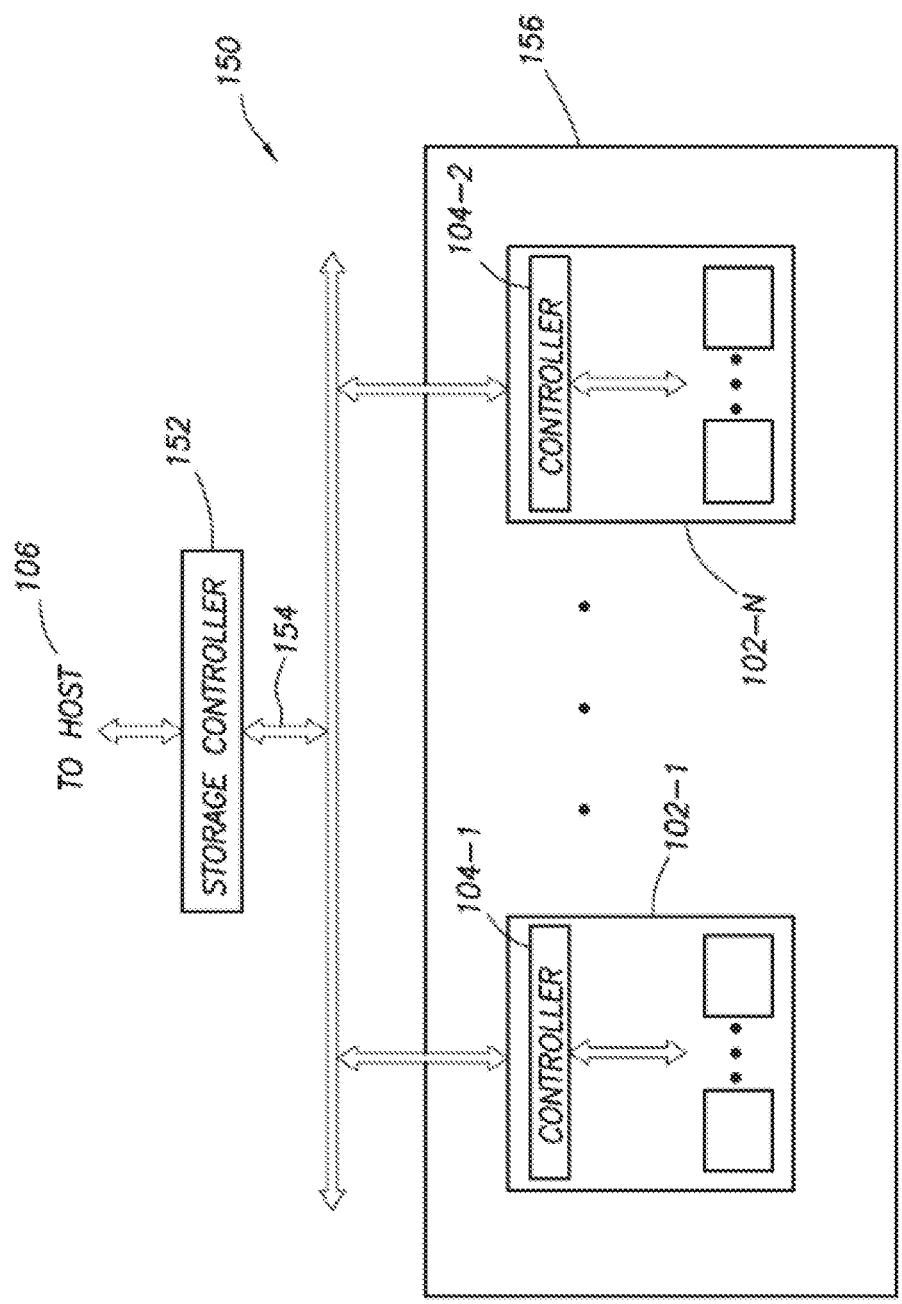

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, non-volatile memory systems are a type of memory that retains stored information without requiring an external power source. Non-volatile memory is widely used in various electronic devices and in stand-alone memory devices. For example, non-volatile memory can be found in laptops, digital audio player, digital cameras, smart phones, video games, scientific instruments, industrial robots, medical electronics, solid-state drives, USB drives, memory cards, and the like. Non-volatile memory can be electronically programmed/reprogrammed and erased.

In such memory systems, memory management operations, such as garbage collection (e.g., compaction), are typically performed in order to reclaim memory that may include old or stale data. This may free up reclaimed memory for reprogramming and may generally improve memory performance. Memory systems use memory address information to identify and/or locate memory for garbage collection operations. Typically, such memory address information includes physical-to-logical address information, which indicates a mapping between physical addresses of the memory to logical address of the memory. Such memory address information is typically stored in a table in memory of the memory system, referred to as a reverse group address table (RGAT).

For example, when data is written to a memory fragment (e.g., a host write), an entry in a logical-to-physical address mapping table, which may be referred to as a group address table (GAT), is created. The entry, referred to as a memory fragment entry, indicates the memory fragment, and points to the memory block where the memory fragment is physically located. The RGAT may represent physical-to-logical address information associated with a memory block. The information may indicate logical group numbers of logical groups having at least some memory fragments within the memory block. The information may further indicate offset values of the memory fragments within the memory block (e.g., the offset values may indicate a position or location of the memory fragment within the memory block). As a memory fragment is written to a memory block, the physical-to-logical mapping table associated with the memory block is updated to include the logical group number associated with the memory fragment. The memory system may then use the RGAT during performance of garbage collection operations to identify memory fragments associated with logical memory groups.

In some systems, such as low cost retail automotive systems, the RGAT table is used to reduce latency in garbage collection. However, the RGAT may require an undesirable amount of memory in such systems. Accordingly, systems and methods, such as those described herein, that are configured to store physical-to-logical address information in memory fragments of a memory block during performance of write operations, may be desirable. In some embodiments, the systems and methods described herein may be configured to stuff (e.g., store) control metadata to a host block (e.g., a memory block being written to) at certain boundaries, alongside a last memory fragment of the host block. The boundaries are dynamically selected based on the randomness of data stored in cache during the write operation. For example, the systems and methods described herein may be configured to determine whether a memory fragment of a memory block (e.g., being written to) is a last memory fragment of the memory block. When the memory fragment is the last memory fragment of the memory bloc, the systems and methods described herein may be configured to write, to the memory fragment, control metadata associated with physical-to-logical address information stored in the cache.

The systems and methods described herein may also be configured to, in response to a determination that the memory fragment is not the last memory fragment of the memory block: perform a write operation on the memory fragment. The systems and methods described herein may also be configured to store, in cache associated with the memory system, physical-to-logical address information associated with the memory fragment. The systems and methods described herein may also be configured to, in response to a determination that the cache is full, write, to a next memory fragment of the memory block, control metadata associated with physical-to-logical address information stored in the cache.

In some embodiments, when the data stored in cache is sequential data, the systems and methods described herein may be configured to write a single logical block address and a run-length in a header of the last memory fragment, indicating physical-to-logical address information for each memory fragment in the memory block corresponding to the sequential data. Conversely, when the data stored in cache is random data, the systems and methods described herein may be configured to write a logical block address for every memory fragment associated with the random data.

By using physical-to-logical stuffing in the host write block, based on the data pattern, the systems and methods described herein may enable the memory system to have only as many physical-to-logical address control entries as is required (e.g., far fewer physical-to-logical address control entries than typical RGAT entries). This enables minimal (and only necessary) block and cache usage for physical-to-logical address information, which may improve performance of the memory system during garbage collection.

FIG. 1A illustrates a block diagram of an example system architecture 100 including non-volatile memory. In particular, the example system architecture 100 includes storage system 102 (e.g., which may be referred to as a memory system), a controller 104, and a host 106. In various embodiments, the host 106 can include any device or system that utilizes the storage system 102. In some embodiments, various aspects of the controller 104 may be implemented by the host 106 or the host 106 can include its own controller (e.g., a processor) configured to execute instructions stored in the storage system 102 and further the host 106 can access data stored in the storage system 102.

Examples of the host 106 include computing devices such as a desktop computer, rack mounted server, a laptop, a smartphone, a tablet, or other suitable computing devices. Host 106 can also include systems and devices such as a gaming system, a digital phone, a digital camera (e.g., digital still cameras and digital movie cameras), portable media player, digital photo frame, remote control, television stick, smart television, and the like. Furthermore, the system architecture 100 can be implemented in a memory card such as secure digital (SD) card or a micro secure digital (micro-SD) card. In some embodiments, the system architecture 100 is embedded in the host, for example as a solid-state disk (SSD) drive installed in a laptop computer.

In embodiments where the system architecture 100 is implemented within a memory card, the host 106 can include a built-in receptacle for one or more types of memory cards or flash drives (e.g., a universal serial bus (USB) port, or a memory card slot). Additionally, or alternatively, the host 106 can include adapters into which a memory card may be plugged. The foregoing examples of a host are not meant to be limiting examples. On the contrary, a host 106 can include any type of device, system, and apparatus that accesses the storage system 102.

In FIG. 1A, the storage system 102 includes a memory controller and drivers (e.g., controller 104)—as will be described further below—however, in some embodiments of the storage system 102, the storage system 102 may include memory-only units that are instead controlled by software executed by a controller on the host 106 (e.g., a processor of a computing device controls, including error handling of, the storage system 102). Furthermore, although FIG. 1A illustrates the storage system 102 as separate from the host 106, in some embodiments, the storage system 102 is embedded with the host 106, where the memory, controller, and drivers are formed on a single integrated circuit chip.

The host 106 can communicate with the storage system 102 using of a bus 112 that implements any known or after developed communication protocol that enables the storage system 102 and the host 106 to communicate. The communication protocol may include Secure Digital (SD) protocol, Memory stick (MS) protocol, USB protocol, Advanced Microcontroller Bus Architecture (AMBA), or other suitable communication protocol.

In various embodiments, the controller 104 acts as an interface between the host 106 and the storage system 102. The host 106 may communicate with the controller 104 via a bus interface associated with the bus 112. The controller 104 can include individual circuit components, processing circuitry (e.g., logic gates and switches), a processor, a microprocessor, a microcontroller with controlling software, or a field programmable gate array (FPGA). Furthermore, the example controller 104 includes a computer-readable medium that stores computer-readable program code (e.g., software or firmware) executable by the processor. In some embodiments, the controller 104 is a flash memory controller. In some embodiments, the controller 104 is a processor executing within the host 106.

Still referring to FIG. 1A, according to some embodiments, the controller 104 acts as an interface between the host 106 and the storage system 102 and manages data stored on the storage system 102. For example, the controller 104 may receive commands or instructions from the host 106 and may perform read operations, write operations, programming operations, erase operations, other suitable operations, or a combination thereof on the memory of the storage system 102 in response to the commands or instructions communicated by the host 106. The host 106 can access data stored in the storage system 102 by providing a logical address, via the bus interface associated with the bus 112, to the controller 104, which, the controller 104 converts to a physical address. The controller 104 can access data and/or a particular storage location associated with the physical address and facilitate transferring data between the storage system 102 and the host 106. In some embodiments, where the storage system 102 includes flash memory, the controller 104 formats the flash memory to ensure the memory is operating properly, maps out bad flash memory cells, and allocates spare cells to be substituted for future failed cells or used to hold firmware to operate the flash memory controller (e.g., the controller 104).

Accordingly, the controller 104 performs various memory management functions such as wear leveling (e.g., distributing writes to extend the lifetime of the memory blocks), garbage collection (e.g., moving valid pages of data to a new block and erasing the previously used block), and error detection and correction (e.g., read error handling).

Still referring to FIG. 1A, the storage system 102 includes the non-volatile memory (NVM) block 110 which may include several memory die 110-1-110-N. In some embodiments, the NVM block 110 defines a physical set of memory die, such as the memory die 110-1-110-N. In other embodiments, the NVM block 110 defines a logical set of memory die, where the NVM block 110 includes memory die from several physically different sets of memory die. The manner in which the NVM block 110 is defined in FIG. 1A is not meant to be limiting.

Each memory die, for example memory die 110-1, includes non-volatile memory cells, such as NAND flash memory cells, NOR flash memory cells, or other suitable memory cells. As the memory cells are non-volatile, the memory cells in the storage system 102 retain data even when there is an interruption in power supplied to the memory cells and/or the storage system 102. Thus, the storage system 102 can be easily transported and the storage system 102 can be used in memory cards and other memory devices that are not always connected to a power supply.

In various embodiments, the memory cells in the memory die 110 are solid-state memory cells (e.g., flash) and are one-time programmable, few-time programmable, or many time programmable. Additionally, the memory cells in the memory die 110 can include single-level cells (SLC), multiple-level cells (MLC), or triple-level cells (TLC). In some embodiments, the memory cells are fabricated in a planar manner (e.g., 2D NAND (NOT-AND) flash) or in a stacked or layered manner (e.g., 3D NAND flash). That is, planar flash memory includes a single layer of memory cell, while stacked flash memory includes memory cells that are stacked vertically in multiple layers (e.g., referred to as planes).

In some embodiments, and as shown in FIG. 1A, the controller 104 and the NVM block 110 are communicatively coupled by an interface 114 that implements any known or after developed communication protocol. In embodiments where the storage system 102 is flash memory, the interface 114 is a flash interface, such as Toggle Mode 200, 400, 800, or Common Flash Memory Interface (CFI). In various embodiments, the interface 114 can be implemented by several channels (i.e., physical connections) disposed between the controller 104 and the individual memory die 110-1-110-N. Furthermore, the number of channels over which the interface 114 is established varies based on the capabilities of the controller 104. Additionally, a single channel can be configured to communicatively couple more than one memory die. The depiction of a single interface 114 is not meant to be limiting. To the contrary, the single interface is representative of an example interface that can be used between components, and one or more interfaces can be used to communicatively couple the same components.

FIG. 1B generally illustrates a block diagram of the system architecture 100 according to the principles of the present disclosure. The system architecture 100 can be implemented as part of a larger system architecture. For example, as shown in FIG. 1B, the system architecture 150 includes a storage module 156 that further includes several storage systems 102. Within the example system architecture 150, the storage module 156 is communicatively coupled with the host 106 by way of a storage controller 152. In particular, an interface 154 between the host 106 and the storage module 156 includes a bus interface that implements any known or after developed communication protocol, such as a serial advanced technology attachment (SATA) or peripheral component interface express (PCIe) interface. In some embodiments, the storage module 156 is an SSD (e.g., in a laptop computer or a tablet).

Some implementations of the system architecture 100 include a hierarchical storage system. A hierarchical storage system can include a plurality of storage controllers 152, each of which control a respective storage system 102. Furthermore, a plurality of hosts 106 can each access the hierarchical storage system. Hosts 106 can access memories within the hierarchical storage system via a bus interface that implements any known or after developed communication protocol including a non-volatile memory express (NVMe) or a fiber channel over Ethernet (FCoE) interface. The hierarchical storage system can be implemented as a rack mounted storage system that is accessible by multiple host computers (e.g., a data center).

The interface 154 can be implemented by several channels (i.e., physical connections) disposed between the storage controller 152 and the storage module 156. In some embodiments, the number of channels over which an interface 154 is established varies based on the capabilities of the storage controller 152. The depiction of a single interface is not meant to be limiting and the single interface is representative of an example interface that can be used between components, where one or more interfaces can be used to communicatively couple various components.

Figure 2A:
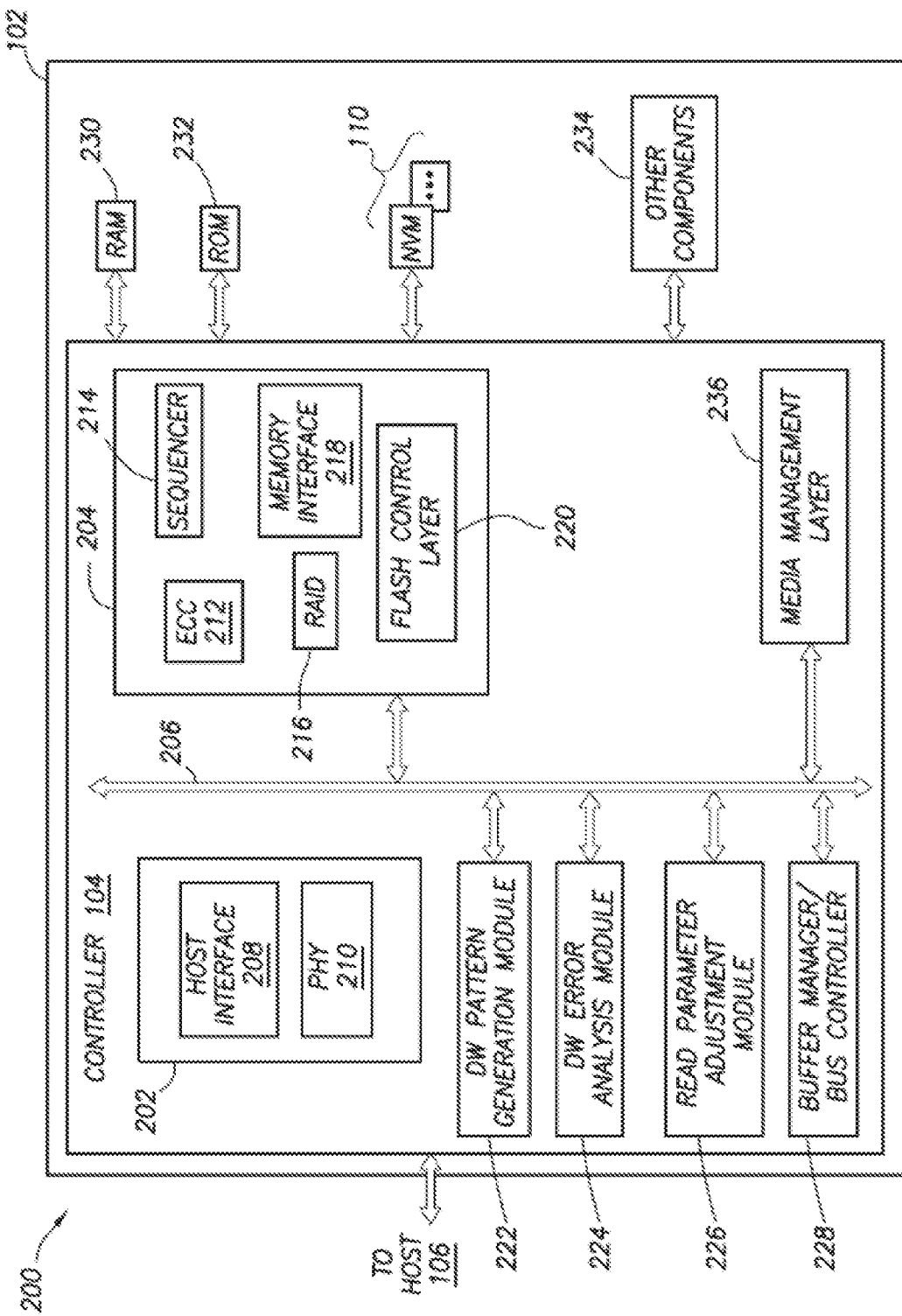
FIG. 2A generally illustrates a block diagram of example components of a controller according to the principles of the present disclosure.

FIG. 2A generally illustrates a block diagram 200 of the storage system 102, according to the principles of the present disclosure. The block diagram 200 of the storage system 102 includes components previously described in FIG. 1A, such as the controller 104 and the NVM memory block 110. Additional components that can be present within the storage system 102 include a random access memory (RAM) 230, a read only memory (ROM) 232, and other components 234. In some embodiments, the ROM 232 stores system boot code.

Although the RAM 230 and the ROM 232 are shown as separate modules within the storage system 102, the illustrated architecture is not meant to be limiting. For example, the RAM 230 and the ROM 232 can be located within the controller 104. In some embodiments, portions of the RAM 230 or ROM 232, respectively, are located outside the controller 104 and within the controller 104. In other embodiments, the controller 104, the RAM 230, and the ROM 232 can be located on separate semiconductor die. In various embodiments, the other components 234 include external electrical interfaces, external RAM, resistors, capacitors, logic gates, or other components that interface with the controller 104.

In some embodiments, the controller 104 includes a module 202 that interfaces with the host 106, a module 204 that interfaces with the NVM memory block 110, as well as various other modules, described further below. The modules within the controller (e.g., modules 202 and 204) are communicatively coupled to each other by a bus 206.

The following discussion of the various modules depicted within the controller 104 are meant to be illustrative and not limiting. For example, the various modules generally illustrated in FIG. 2A are not limited to being executed within the controller 104, and in some embodiments, one or more modules can be executed outside the controller 104.

The module 202 interfaces with the host 106 and includes a host interface 208 and a physical layer interface 210 that provides the electrical interface between the host 106 or next level storage controller and the controller 104. The host interface 208 facilitates transferring of data, control signals, and timing signals. Examples of the host interface 208 include SATA, SATA express, Serial Attached SCSI (SAS), Fibre Channel, USB, PCIe, and NVMe.

Still referring to FIG. 2A, in various embodiments, the module 204 is configured to communicate with the NVM block 110 and includes an error correcting code (ECC) engine 212. In some embodiments, the ECC engine 212 encodes data received from the host 106 and stores the encoded data in the NVM block 110. When the data is read out from the NVM memory block 110, the ECC engine 212 decodes the data and corrects errors detected within the data To detect errors, the ECC engine 212 implements various types of error checking using algorithms such as low-density parity-check (LDPC) code, Bose-Chaudhuri-Hocquenghem (BCH) code, a soft read, and/or extra parity.

The example module 204 also includes a sequencer 214 and a Redundant Array of Independent Drives (RAID) module 216. In various embodiments, the sequencer 214 generates command sequences, such as program and erase command sequences that are transmitted to the NVM memory block 110. The RAID module 216 generates RAID parity and recovery of failed data. The RAID parity can be used to provide an additional level of integrity protection for data written into the NVM memory block 110. In some embodiments, the ECC engine 212 implements the functions of the RAID module 216.

The example module 204 also includes a memory interface 218 that provides the command sequences to the NVM memory block 110 and receives status information from the NVM memory block 110. For example, the memory interface 218 implements any known or after developed communication protocol including a double data rate (DDR) interface, such as a Toggle Mode 200, 400, or 800 interface. The module 204 also includes a flash control layer 220 that controls the overall operation of the module 204.

Still referring to example modules within the controller 104 in FIG. 2A, additional modules within the controller 104 includes a dummy word line (DW) pattern generation module 222, a DW error analysis module 224, and a read parameter adjustment module 226. Dummy word lines are placed on non-volatile memory die that are used for the purposes of analyzing and tracking behavior and health of a respective non-volatile memory die. In various embodiments, the DW pattern generation module 222 puts a known data pattern into a dummy word line and tracks or periodically check for errors by reading the data back out of the dummy word line and comparing the data to the known data pattern.

In various embodiments, the read parameter adjustment module 226 adjusts parameters associated with a particular non-volatile memory die. For example—and as discussed further below—the read parameters adjustment module 226 can adjust parameters associated with a particular non-volatile memory die during an operation—i.e., a read or write—to adjust or re-adjust the read parameters. During the operation to re-adjust the read parameters, the read parameter adjustment module 226 adjusts the read parameters for a particular memory block, reads data out of the memory block, and verifies a resulting BER. If the resulting BER falls at or below a target or expected BER, the read parameters adjustment module 226 stores the read parameters for the memory block. Subsequently, the stored read parameters are used during a read of any word line within the memory block. Thus, read parameters can be unique to a memory block.

Additional modules within the example controller 104 include a buffer manager/bus controller 228 that manages, for example, buffers in the RAM 230 and controls the internal bus arbitration of the bus 206 in the controller 104. Additionally, or alternatively, the controller 104 can include a media management layer 236 that performs wear leveling of the NVM memory block 110. As previously mentioned, the various modules described with respect to the controller 104 are not meant to be limiting as to the architecture of the controller 104. For example, the physical layer interface 210, the RAID module 216, the media management layer 236, and the buffer management/bus controller 228 can be examples of optional components within the controller 104.

Furthermore, in embodiments where the storage system 102 includes flash memory, the media management layer 236 can be integrated as part of the flash management that handles flash error and interfaces with the host 106. In particular, the media management layer 236 can include an algorithm (e.g., firmware in the memory device), that translates a write command received from the host 106 into a write to the NVM memory block 110.

Figure 2B:
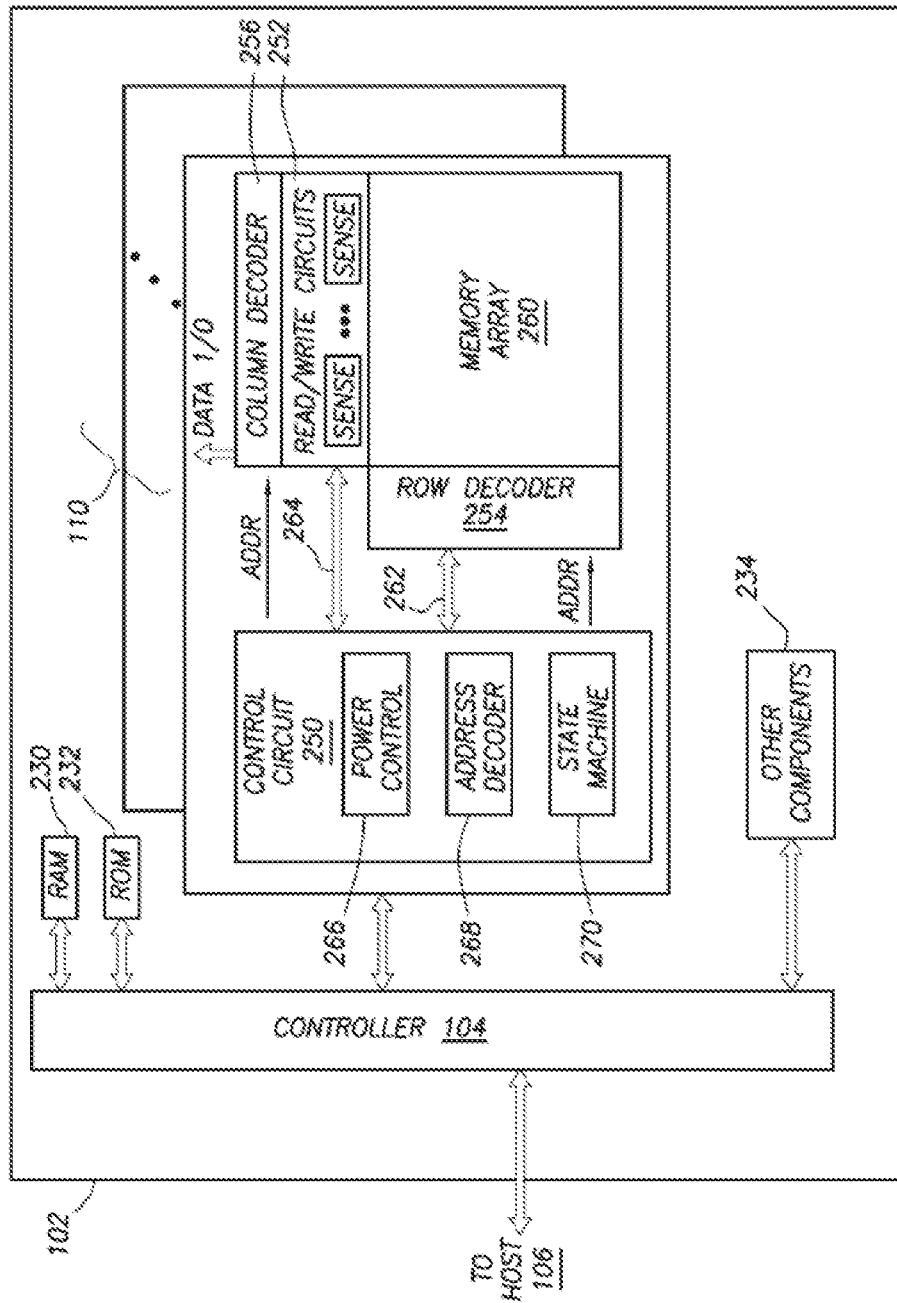
FIG. 2B generally illustrates a block diagram of example components of a non-volatile memory storage system according to the principles of the present disclosure.

FIG. 2B generally illustrates a block diagram with various features of the NVM memory block 110 within the storage system 102. As details of the controller 104 have been previously described (in FIG. 2A), in FIG. 2B the controller 104 is illustrated as a single block. Additionally, previously described RAM 230, the ROM 232, and the other components 234 are included in FIG. 2B to help orient the reader. Next, details within an example memory die 110-1 are discussed. Although the discussion centers on the memory die 110-1, each of the features discussed in relation to the memory die 110-1 equally applies to all of the memory dies within NVM memory block 110.

In some embodiments, the example memory die 110-1 includes control circuit 250, read/write circuits 252, a row decoder 254, a column decoder 256, and a memory array 260. The memory array 260 can include a two-dimensional array or a three-dimensional array of memory cells. The read/write circuits 252 read and program pages of memory within the memory die 110-1, in parallel. In various embodiments, the memory array 260 is accessed by word lines via the row decoder 254 and by bit lines via the column decoder 256.

The architecture of the memory die 110-1 is not meant to be limiting and any known architecture that can perform the functions of accessing the memory array 260 can be used without departing from the scope of this disclosure. For example, in various embodiments, access to the memory array 260 by various peripheral circuits can be implemented in a symmetric fashion on opposite sides of the memory array 260, which reduces the densities of access lines, and circuitry on each side of the memory array 260.

Still referring to FIG. 2B, in various embodiments, the example control circuit 250 includes a power control circuit 266, an address decoder 268, and a state machine 270. In some embodiments, the power control circuit 266, the address decoder 268, and the state machine 270 can be collectively referred to as managing circuits. The control circuit 250 and its various managing circuits are communicatively coupled by various interfaces (e.g., interfaces 262 and 264) to the row decoder 254 and the column decoder 256. In various embodiments, the control circuit 250 performs various operations on the memory array 260 that include reading or writing to the memory cells.

The power control circuit 266 controls the power and voltage supplied to the word lines and bit lines during operation of the memory array 260. The address decoder 268 provides an address interface that translates addresses between addresses provided by the host 106 and addresses used by the row decoder 254 and the column decoder 256. The example address decoder 268 converts an address provided by the host 106 to an address that is understood and compatible with a format used by the row decoder 254 and the column decoder 256. The state machine 270 provides chip-level control of memory operations.

Thus, the storage system 102 includes various components including the controller 104 and the NVM memory block 110, details of which have been described above in FIGS. 1A, 1B, 2A, and 2B. The discussion now turns to an example architecture of an example memory array 260 and in particular methods that can be performed to improve a performance of a read in the storage system 102.

FIG. 3 further illustrates the memory array 260. The memory array 260 is divided into several memory blocks 302. In flash memory, a memory block is defined as a unit of erase. That is, each memory block 302 includes a number of memory cells that are erased together or as a block. In some embodiments, the memory array 260 can be partitioned into any number of blocks, for example, the memory array 260 includes 1,024 blocks. Additionally, or alternatively, each of the memory blocks 302 can conceptually be divided into a number of pages defined as a unit of programming. In some embodiments, a page of data can be stored in one row of memory cells. Each page can include user data and overhead data, where the overhead data includes CC that has been calculated from the user data. In some embodiments, the memory blocks 302-1 to 302-N may include solid-state NAND memory blocks.

Each memory block 302, for example memory block 302-1, includes multiple bit lines 304, word lines 306, and select lines 308. Each bit line, for example bit line 304-1, is connected to several memory cells connected in series. More particularly, in an embodiment where each memory cell is a floating gate transistor, the floating gate transistors are connected in series to form a NAND string 310 (e.g., illustrated within the dashed box). Although four memory cells are shown in FIG. 3, the number of memory cells within the NAND string is not meant to be limiting. For example, 16, 32, 64, 128, or any other number of memory cells can be connected in a NAND string. Each respective bit line 304 is coupled to a respective NAND string within the block 302.

Still referring to FIG. 3, a method of reading data stored in a particular memory cell—e.g., memory cell 316—includes applying a voltage to the select lines 308 of the block 302, which in turn are coupled to respective NAND strings within the block 302, including the NAND string 310 the includes the memory cell 316. The voltage applied to the select lines 308 is greater than threshold voltages of the select transistors 312 and 314. The select transistor 312 is controlled by the select gate drain line (SGD) 308-1 and the select transistor 314 is controlled by the select gate source line (SGS) 308-2. Additionally, in order to read data in the memory cell 316, all other memory cells or unselected memory cells in the NAND string 319 are turned on (e.g., conducting current regardless of whether they are programmed or erased). The unselected memory cells have a read pass voltage—i.e., read parameters—applied to their respective word lines that turn on the unselected memory cells.

During the example read operation, various read compare levels—i.e., voltages—are applied to the word line 306-2 to determine the value stored in the memory cell 316. In some embodiments, the conduction current of the memory cell 316 is measured to determine the value stored within the memory cell 316. The method in which each memory cell is accessed and the number of memory cells accessed during a read or write varies. For example, all of the bit lines of the memory block 302-1 can be simultaneously programmed or read. In various embodiments, memory cells along a shared word line can be programmed at the same time (i.e., concurrently). In other embodiments, the bit lines can be divided into even bit lines and odd bit lines. In an odd/even bit line architecture, memory cells along a shared word line and connected to the odd bit lines are programmed at one time, while memory cells along a shared word line and connected to an even bit line are programmed at a different time.

Each time data is written to a memory block the data is processed by the ECC engine 212 which includes encoding the data (e.g., using a particular error correction code) and storing the encoded data in the memory block. When the data is read back out of the memory block, the data is processed by the ECC engine 212 which includes decoding the data, correcting errors (e.g., tracked as the BER), and returning the data to a user (by way of the controller 104). In some embodiments, the amount of time the ECC engine 212 takes to return data to the controller 104 is defined as the throughput time.

In some embodiments, the controller 104 performs data consolidation operations on the memory array 260. The controller 104 selects a source block from the memory block 302-1 to memory block 302-N of the memory array 260, for consolidation or compaction. For example, the controller 104 may select memory block 302-1 as the source block for consolidation or compaction. The memory block 302-1 may be referred to as the source block 302-1 throughout the example embodiments described herein. The source block 302-1 may include a plurality of memory fragments, such as 16 memory fragments or any suitable number of memory fragments. The memory fragments may include data written by the host 106 during a host write operation. The memory fragments may belong to respective logical groups and may be scattered or disorganized in the source block 302-1, such that memory fragments associated with the same logical group may not be sequentially stored or organized in the source block 302-1. Additionally, or alternatively, while some memory fragments include data written by the host 106 during a host write operation, other memory fragments scattered throughout the source block 302-1 may be blank (e.g., having been erased by the host 106 or the controller 104 or having not been written to by the host 106).

In some embodiments, the controller 104 is configured to manage physical-to-logical address information for the memory blocks 302-1 to 302-N, as described. The controller 104 may be configured to store physical-to-logical address information of memory fragments (e.g., 4 kilobytes (4k) of memory storage) of the memory blocks 302-1 to 302-N in respective memory blocks 302-1 to 302-N as control metadata when the controller 104 performs write operations on the memory blocks 302-1 to 302-N. For example, the controller 104 may perform a write operation on a first memory fragment of a first memory block, such as the memory block 302-1 (e.g., referred to as the host block). It should be understood that the controller 104 may perform the write operations on any suitable memory block of the storage system 102.

When the controller 104 writes data to the memory fragment, the controller 104 stores physical-to-logical address information associated with the memory fragment. The physical-to-logical address information may include a logical block address associated with the memory fragment, other suitable physical-to-logical address information, or a combination thereof. The controller 104 may store the physical-to-logical address information in a cache associated with the storage system 102 or other suitable volatile or non-volatile memory associated with the storage system 102. The cache may include 4k of storage capacity, or other suitable storage capacity.

The controller 104 may separate physical-to-logical address information for random data and sequential data (e.g., random and sequential data written to the memory fragments of the memory block 302-1). For example, when the controller 104 writes data (e.g., that corresponds to sequential data) to a memory fragment, the controller 104 stores physical-to-logical address information that includes logical block address information and a run length for the previous data entries in the memory block 302-1. The logical block address information may indicate a first logical block (e.g., a memory fragment) having data corresponding to the sequential data and the run length may indicate how many memory fragments include data corresponding to the sequential data. When the controller 104 writes data (e.g., corresponding to random data) to a memory fragment, the controller 104 stores physical-to-logical address information that includes the logical block address information of the previous data entries.

The physical-to-logical address information for sequential data may be smaller than physical-to-logical address information for random data. For example, for sequential data, the controller 104 stores one logical block address of 4 bytes and a run length of 2 bytes in the cache for every memory fragment (e.g., one entry of 6 bytes will be stored in cache for each sequential write and multiple such entries will be accumulated in the cache). Accordingly, the cache being 4k can accumulate 682 entries of sequential control metadata before becoming full. For random data, the controller 104 stores logical block address information of 4 bytes for all the memory fragments associated with the random data (e.g., 1024 entries of physical-to-logical address information for each memory fragment written by the controller 104 for random data). Accordingly, the cache being 4k may become full more frequently than is the case with sequential data.

As the controller 104 continues to write data to various memory fragments associated with the memory block 302-1, the physical-to-logical address information continues to accumulate in the cache. When the cache is full (e.g., 4k of physical-to-logical address information is stored in the cache), the controller 104 generates control metadata corresponding to the physical-to-logical address information stored in the cache. The control metadata may indicate, for sequential data, a first logical block address in the sequential data writes and a run length indicating the number of memory fragments are included in the sequential data writes. Conversantly, for random data, the control metadata may indicate logical block address information for each memory fragment written with the random data. The controller 104 may store in a the next memory fragment (e.g., the memory fragment in the memory block 302-1 that follows the previously written memory fragment) the control metadata. The controller 104 may then flush (e.g., empty) the cache.

The controller 104 may then continue to perform write operations on subsequent memory fragments of the memory block 302-1 until the cache becomes full again. The controller 104 then generates control data corresponding to the physical-to-logical information stored in the cache. The controller 104 stores the control metadata in the next memory fragment and flushes the cache. The controller 104 continues to perform write operations on the memory fragments of the memory block 302-1 until the controller 104 reaches the last memory fragment of the memory block 302-1. The controller 104 then stores control metadata corresponding to the physical-to-logical address information stored in the cache to the last memory fragment of the memory block 302-1, regardless of whether the cache is full (e.g., control metadata is always written to the last memory fragment of the memory block 302-1 and the cache is flushed). In some embodiments, when the data stored in the cache is sequential data, the controller 104 may store, in the header of the last memory fragment of the memory block 302-1, the control metadata corresponding to the sequential data (e.g., 6 bytes indicating the logical block address of the first memory fragment having the sequential data and the run length, as described).

In some embodiments, when the controller 104 performs write operations on the memory block 302-1 and only sequential data is written to the memory fragments of the memory block 302-1, the controller 104 may not store the control metadata until the last memory fragment of the memory block 302-1 (e.g., the cache may not become full). Conversely, when the controller 104 may perform write operations on the memory block 302-1 and only random data is written to the memory fragments of the memory block 302-1, the controller 104 may store the control metadata at regular intervals (e.g., the cache continues to become full).

Figure 5A:
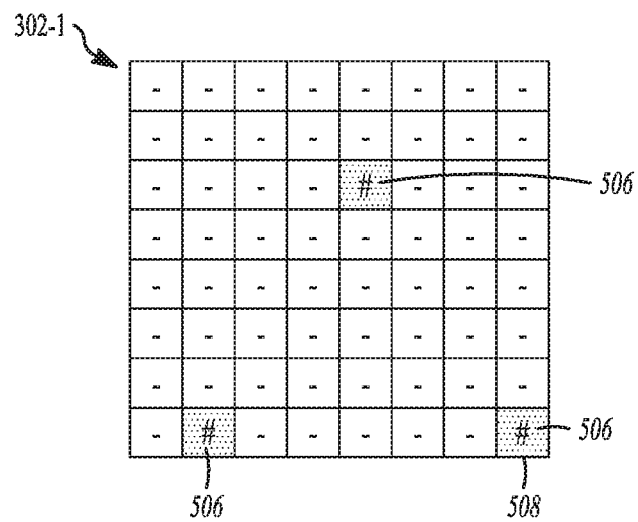
FIGS. 5A-5C generally illustrate memory blocks having various data patterns according to the principles of the present disclosure.

FIG. 5A generally illustrates a memory block, such as the memory block 302-1, having control metadata 506 stored in memory fragments of the memory block 302-1. The data represented in FIG. 5A may include mix data (e.g., some sequential data and some random data). Accordingly, the control metadata 506 is stored in multiple memory fragments (e.g., each time the cache becomes full). The memory block 302-1 illustrated in FIG. 5A also includes control metadata 506 stored in a last memory fragment 508 of the memory block 302-1.

Figure 5B:
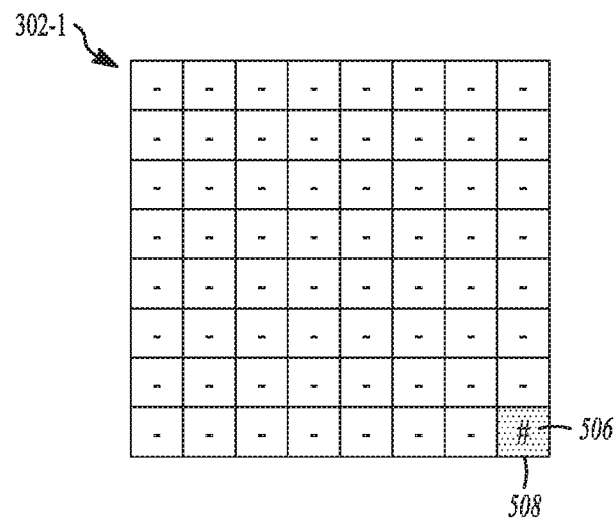
Figure 5C:
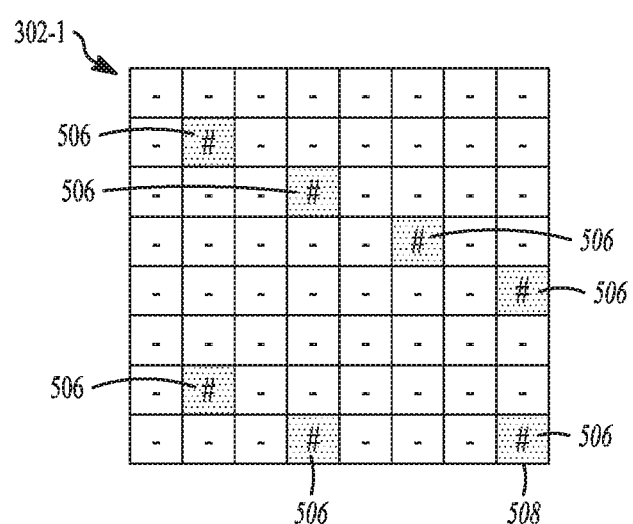

FIG. 5B generally illustrates the memory block 302-1 having sequential data (e.g., purely sequential data). Accordingly, the control metadata 506 is stored the last memory fragment 508 of the memory block 302-1. FIG. 5C generally illustrates the memory block 302-1 having control metadata 506 stored in memory fragments of the memory block 302-1. The data represented in FIG. 5C may include random data. Accordingly, the control metadata 506 is stored in multiple memory fragments (e.g., each time the cache becomes full). The memory block 302-1 illustrated in FIG. 5C also includes control metadata 506 stored in a last memory fragment 508 of the memory block 302-1.

In some embodiments, the controller 104 may generate a master table that is stored in memory associated with the storage system 102. The master table may include information indicating a location of control metadata in a memory block, such as the memory block 302-1. For example, the master table may include a data structure that indicates a block number associated with the memory block 302-1 and a 4k offset (e.g., number of memory fragments from 0). The data structure may include each entry of 4 bytes and in the case of multiple opens blocks, a swap-in/swap-out technique may be used for the cache. When the controller 104 performs garbage collection information, the controller 104 may read the information stored in the data structure in the master table to identify the memory block and an offset indicating which memory fragment of the memory block includes the control metadata. The controller 104 may use the control metadata to perform the garbage collection, as described. FIG. 6 generally illustrates an example data structure 600.

Figure 7:
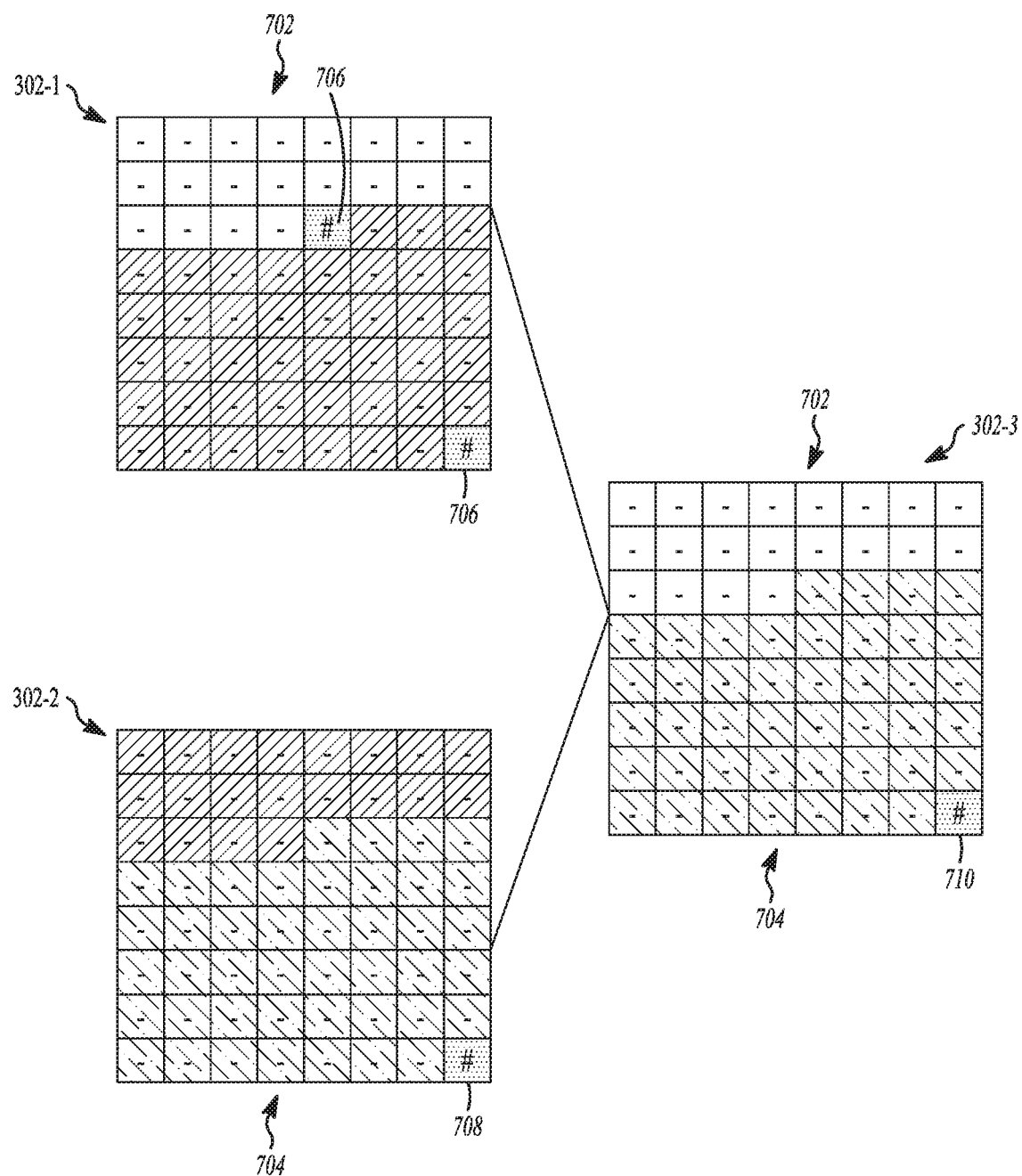
FIG. 7 generally illustrates a garbage collection diagram according to the principles of the present disclosure.

In some embodiments, the controller 104 is configured to store control metadata during when the controller 104 performs garbage collection operations, as is generally illustrated in FIG. 7. For example, the controller 104 may select a first memory block of the memory blocks 302-1 to 302-N, such as the memory block 302-1. The memory block 302-1 may include at least some data that is logically sequential, such as the data 702. The controller 104 may select a second memory block of the memory blocks 302-1 to 302-N, such as the memory block 302-2. The memory block 302-2 may also include at least some logically sequential data, such as the data 704. The data 704 and the data 702 may be related or correspond logically to one another. The controller 104 may identify the memory block 302-1 and the memory block 302-2 using the master table and control metadata 706 stored in the memory block 302-1 and control metadata 708 the memory block 302-2 indicating the sequential data.

The controller 104 may consolidate the sequential data 706 from the memory block 302-1 and the sequential data 708 from the memory block 302-1 into a destination memory block of the memory blocks 302-1 to 302-N, such as the memory block 302-3. The controller 104 may store control metadata 710 in the last memory fragment of the destination memory block 302-3 indicating the first logical block address of the sequential data and a run length, as described. The controller 104 may update the master table to indicate the location of the control data 710 in the last memory fragment of the destination block 302-3. Accordingly, the controller 104 may generate, while performing garbage collection operations, a memory block having groups of sequential data, a purely sequential memory block, or other suitable memory block (e.g., a best fit of closely related logical data is consolidated to the destination block). Consolidating such logical data may provide improved data desegregation.

In some embodiments, the controller 104 stores the control metadata in a control memory block instead of in the memory block being written to when the controller 104 performs write operations.

In some embodiments, the controller 104 may perform the methods described herein. However, the methods described herein as performed by the controller 104 are not meant to be limiting, and any type of software executed on a controller can perform the methods described herein without departing from the scope of this disclosure. For example, a controller such as a processor executing software within the host 106 or firmware within the storage system 102 (e.g., stored on ROM 232 or NVM memory block 110) can perform the methods described herein.

Figure 4:
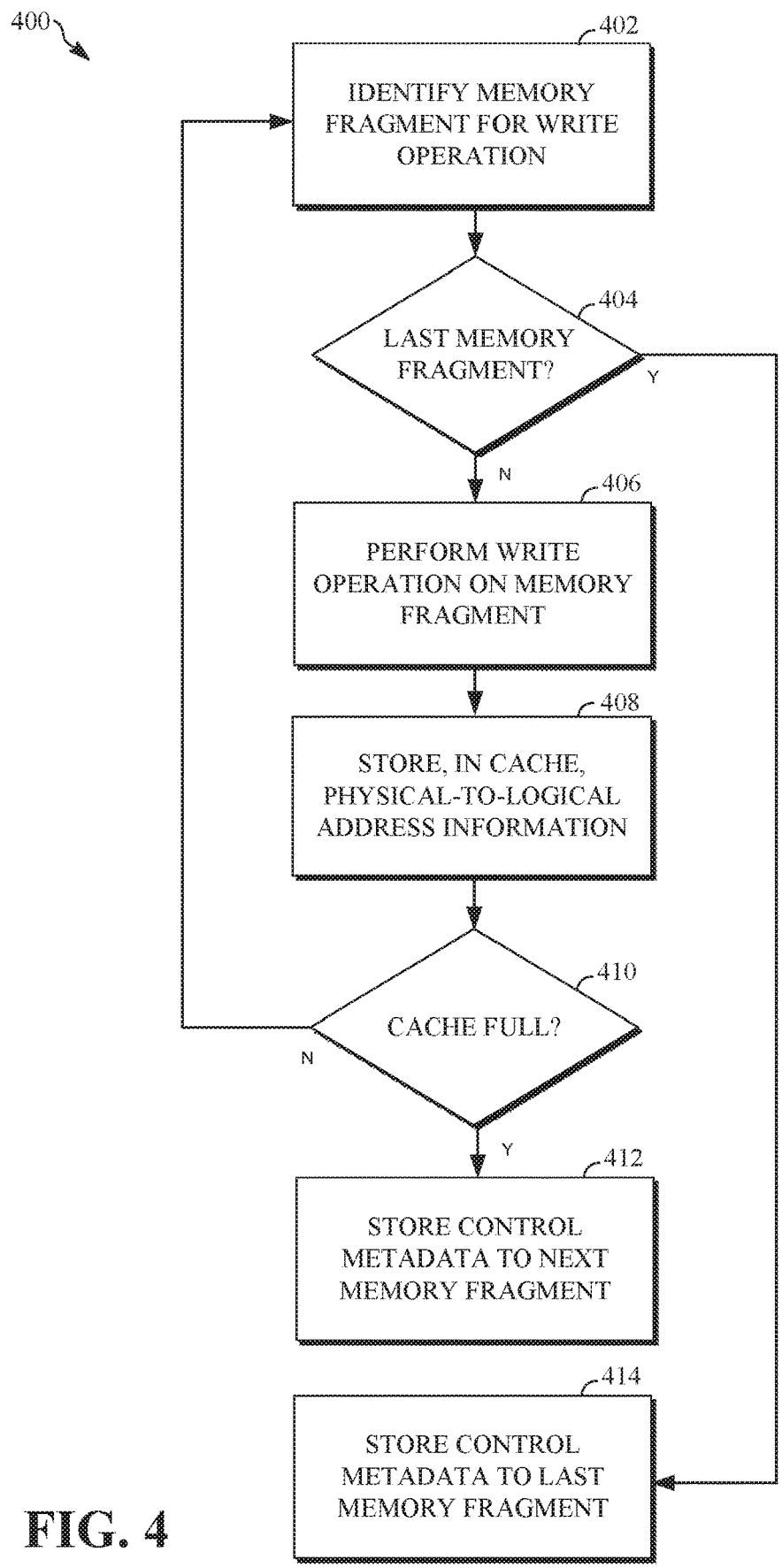
FIG. 4 is a flow diagram generally illustrating a physical-to-logical address management method according to the principles of the present disclosure.

FIG. 4 is a flow diagram generally illustrating a physical-to-logical address management method 400 according to the principles of the present disclosure. At 402, the method 400 identifies a memory fragment for the write operation. For example, the controller 104 may identify a memory fragment of the memory block 302-1 to be written to during performance of the write operation. At 404, the method 400 determines whether the memory fragment of the memory block is the last memory fragment. For example, the controller 104 determines if the memory fragment is the last memory fragment of the memory block 302-1. When the controller 104 determines that the memory fragment is the last memory fragment of the memory block 302-1, the method 400 continues at 414. When the controller 104 determines that, the memory fragment is not the last memory fragment of the memory block 302-1, the method 400 continues at 406.

At 406, the method 400 performs a write operation on the memory fragment. For example, the controller 104 performs the write operation on the memory fragment of the memory block 302-1. At 408, the method 400 stores, in cache, physical-to-logical address information. For example, the controller 104 stores the physical-to-logical address information associated with the memory fragment, as described. At 410, the method 400 determines whether the cache is full. For example, the controller 104 determines whether the cache is full. When the controller 104 determines that the cache is not full, the method 400 continues at 402. When the controller 104 determines that the cache is full, the method 400 continues at 412. At 412, the method 400 stores control metadata to the next memory fragment. For example, the controller 104 generates the control metadata based on the physical-to-logical address information stored in the cache, as described. The controller 104 stores the control metadata in the next memory fragment of the memory block 302-1. The controller 104 then continue, as described. At 414, the method 400 stores control metadata to the last memory fragment. For example, the controller 104 generates the control metadata based on the physical-to-logical address information stored in the cache, as described. The controller 104 stores the control metadata in the last memory fragment of the memory block 302-1.

In some embodiments, a method for managing physical-to-logical address information in a memory system includes determining whether a memory fragment of a memory block is a last memory fragment of the memory block. The method also includes, in response to a determination that the memory fragment is not the last memory fragment of the memory block: performing a write operation on the memory fragment; storing, in cache associated with the memory system, physical-to-logical address information associated with the memory fragment; and, in response to a determination that the cache is full, writing, to a next memory fragment of the memory block, control metadata associated with physical-to-logical address information stored in the cache.

In some embodiments, the physical-to-logical address information stored in the cache includes sequential data. In some embodiments, the control metadata includes logical block address information associated with the memory fragments and a run length, in response to the physical-to-logical address information stored in the cache including sequential data. In some embodiments, the physical-to-logical address information stored in the cache includes random data. In some embodiments, the control metadata includes logical block address information associated with the memory fragments, in response to the physical-to-logical address information stored in the cache includes random data. In some embodiments, the method also includes, in response to a determination that the memory fragment is the last memory fragment of the memory block, writing, to the memory fragment, control data associated with the physical-to-logical address information stored in the cache. In some embodiments, the method also includes storing, in a master table, information indicating the memory block and offset values indicating a location of the control metadata within the memory block.

In some embodiments, a controller includes a bus interface and a processor. The bus interface is in communication with one or more memory blocks of a memory system. The processor is configured to determine whether a memory fragment of a memory block is a last memory fragment of the memory block. The processor is further configured to, in response to a determination that the memory fragment is not the last memory fragment of the memory block: perform a write operation on the memory fragment; store, in cache associated with the memory system, physical-to-logical address information associated with the memory fragment; and in response to a determination that the cache is full, write, to a next memory fragment of the memory block, control metadata associated with physical-to-logical address information stored in the cache.

In some embodiments, the physical-to-logical address information stored in the cache includes sequential data. In some embodiments, the control metadata includes logical block address information associated with the memory fragments and a run length, in response to the physical-to-logical address information stored in the cache including sequential data. In some embodiments, the physical-to-logical address information stored in the cache includes random data. In some embodiments, the control metadata includes logical block address information associated with the memory fragments, in response to the physical-to-logical address information stored in the cache includes random data. In some embodiments, the processor is further configured to, in response to a determination that the memory fragment is the last memory fragment of the memory block, write, to the memory fragment, control data associated with the physical-to-logical address information stored in the cache. In some embodiments, the processor is further configured to store, in a master table, information indicating the memory block and offset values indicating a location of the control metadata within the memory block.

In some embodiments, a memory management method includes determining whether a memory fragment of a memory block is a last memory fragment of the memory block. The method also includes, in response to a determination that the memory fragment is not the last memory fragment of the memory block: performing a write operation on the memory fragment; storing, in cache associated with the memory system, physical-to-logical address information associated with the memory fragment; and in response to a determination that the cache is full, writing, to a next memory fragment of the memory block, control metadata associated with physical-to-logical address information stored in the cache. The method also includes storing, in a master table, information indicating the memory block and offset values indicating a location of the control metadata within the memory block. The method also includes performing a garbage collection operation on the memory block using the master table and the control metadata stored in the memory block.

In some embodiments, the physical-to-logical address information stored in the cache includes sequential data. In some embodiments, the control metadata includes logical block address information associated with the memory fragments and a run length, in response to the physical-to-logical address information stored in the cache including sequential data. In some embodiments, the physical-to-logical address information stored in the cache includes random data. In some embodiments, the control metadata includes logical block address information associated with the memory fragments, in response to the physical-to-logical address information stored in the cache includes random data. In some embodiments, the method also includes, in response to a determination that the memory fragment is the last memory fragment of the memory block, writing, to the memory fragment, control data associated with the physical-to-logical address information stored in the cache.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module. In some embodiments, the controller 104 is implemented within the host 106 can be configured with hardware and/or firmware to perform the various functions described herein.

"Controller" shall mean individual circuit components, an application-specific integrated circuit (ASIC), a microcontroller with controlling software, a digital signal processor (DSP), a processor with controlling software, a field programmable gate array (FPGA), or combinations thereof.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. A method for managing physical-to-logical address information in a memory system, the method comprising:
    determining whether a memory fragment of a memory block is a last memory fragment of the memory block;
    in response to a determination that the memory fragment is not the last memory fragment of the memory block:
        performing a write operation on the memory fragment;
        storing, in cache associated with the memory system, physical-to-logical address information associated with the memory fragment; and
        in response to a determination that the cache is full, writing, to a next memory fragment of the memory block, control metadata associated with physical-to-logical address information stored in the cache.

2. The method of claim 1, wherein the physical-to-logical address information stored in the cache includes sequential data.

3. The method of claim 2, wherein the control metadata includes logical block address information associated with the memory fragments and a run length, in response to the physical-to-logical address information stored in the cache including sequential data.

4. The method of claim 1, wherein the physical-to-logical address information stored in the cache includes random data.

5. The method of claim 4, wherein the control metadata includes logical block address information associated with the memory fragments, in response to the physical-to-logical address information stored in the cache includes random data.

6. The method of claim 1, further comprising, in response to a determination that the memory fragment is the last memory fragment of the memory block, writing, to the memory fragment, control data associated with the physical-to-logical address information stored in the cache.

7. The method of claim 1, further comprising, storing, in a master table, information indicating the memory block and offset values indicating a location of the control metadata within the memory block.

8. A controller comprising:
    a bus interface in communication with one or more memory blocks of a memory system; and
    a processor configured to:
        determine whether a memory fragment of a memory block is a last memory fragment of the memory block;
        in response to a determination that the memory fragment is not the last memory fragment of the memory block:
            perform a write operation on the memory fragment;
            store, in cache associated with the memory system, physical-to-logical address information associated with the memory fragment; and in response to a determination that the cache is full, write, to a next memory fragment of the memory block, control metadata associated with physical-to-logical address information stored in the cache.

9. The controller of claim 8, wherein the physical-to-logical address information stored in the cache includes sequential data.

10. The controller of claim 9, wherein the control metadata includes logical block address information associated with the memory fragments and a run length, in response to the physical-to-logical address information stored in the cache including sequential data.

11. The controller of claim 8, wherein the physical-to-logical address information stored in the cache includes random data.

12. The controller of claim 11, wherein the control metadata includes logical block address information associated with the memory fragments, in response to the physical-to-logical address information stored in the cache includes random data.

13. The controller of claim 8, wherein the processor is further configured to, in response to a determination that the memory fragment is the last memory fragment of the memory block, write, to the memory fragment, control data associated with the physical-to-logical address information stored in the cache.

14. The controller of claim 8, wherein the processor is further configured to store, in a master table, information indicating the memory block and offset values indicating a location of the control metadata within the memory block.

15. A memory management method comprising:
   determining whether a memory fragment of a memory block is a last memory fragment of the memory block;
   in response to a determination that the memory fragment is not the last memory fragment of the memory block:
      performing a write operation on the memory fragment;
      storing, in cache associated with the memory system, physical-to-logical address information associated with the memory fragment; and
      in response to a determination that the cache is full, writing, to a memory fragment of the memory block, control metadata associated with physical-to-logical address information stored in the cache;
   storing, in a master table, information indicating the memory block and offset values indicating a location of the control metadata within the memory block; and
   performing a garbage collection operation on the memory block using the master table and the control metadata stored in the memory block.

16. The method of claim 15, wherein the physical-to-logical address information stored in the cache includes sequential data.

17. The method of claim 16, wherein the control metadata includes logical block address information associated with the memory fragments and a run length, in response to the physical-to-logical address information stored in the cache including sequential data.

18. The method of claim 15, wherein the physical-to-logical address information stored in the cache includes random data.

19. The method of claim 18, wherein the control metadata includes logical block address information associated with the memory fragments, in response to the physical-to-logical address information stored in the cache includes random data.

20. The method of claim 15, further comprising, in response to a determination that the memory fragment is the last memory fragment of the memory block, writing, to the memory fragment, control data associated with the physical-to-logical address information stored in the cache.

* * * * *